No. 756,620. PATENTED APR. 5, 1904.
W. GHIGLIERI.
NUT LOCK.
APPLICATION FILED JULY 11, 1903.
NO MODEL.
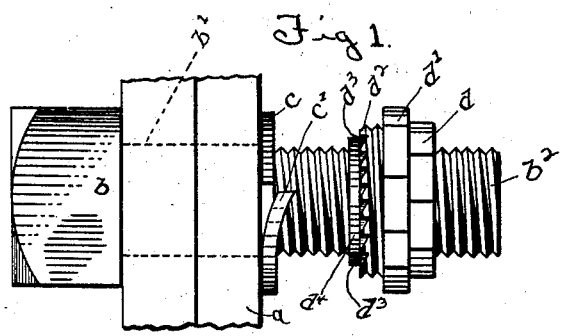
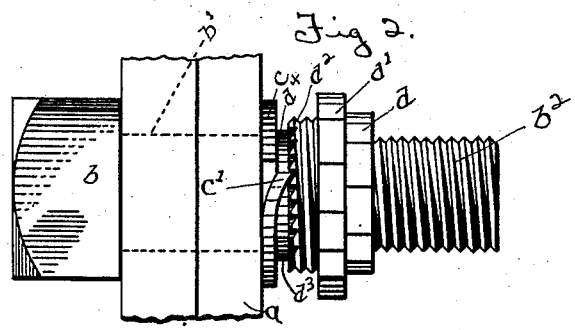
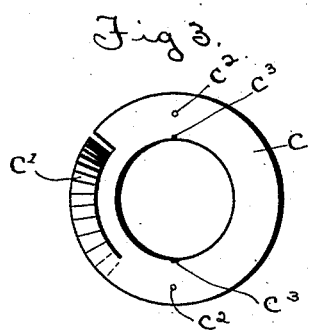
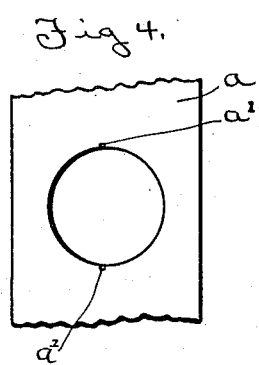

No. 756,620. Patented April 5, 1904.

UNITED STATES PATENT OFFICE.

WILLIAM GHIGLIERI, OF STOCKTON, CALIFORNIA, ASSIGNOR TO UNIVERSAL NUT-LOCK COMPANY, OF STOCKTON, CALIFORNIA, A CORPORATION OF CALIFORNIA.

NUT-LOCK.

SPECIFICATION forming part of Letters Patent No. 756,620, dated April 5, 1904.

Application filed July 11, 1903. Serial No. 165,126. (No model.)

*To all whom it may concern:*

Be it known that I, WILLIAM GHIGLIERI, a citizen of the United States, and a resident of Stockton, in the county of San Joaquin, State of California, have invented a certain new and Improved Nut-Lock, of which the following is a full, clear, and exact description.

This invention relates to a nut-lock of that class in which the face of the nut is provided with teeth which engage with a fixed spring fastened stationary in respect to the bolt.

My device further involves certain novel features of construction which will be fully described hereinafter.

This specification is an accurate description of examples of my invention, and the claims define the actual scope thereof.

Reference is to be had to the accompanying drawings, forming a part of this specification, in which similar characters of reference indicate corresponding parts in all the views.

Figure 1 is a longitudinal plan of the invention, showing the nut disconnected from the holding-spring. Fig. 2 is a similar view showing the teeth of the nut in contact with the holding-spring. Fig. 3 is a detached plan view of a washer, showing the holding-spring. Fig. 4 is a detached plan view of the parts to be held together.

I designate the parts to be held together by the bolt as $a$. The parts $a$ of course will be prepared with a circular hole for the reception of the bolt. Upon the face of the parts $a$ nearest the nut at the periphery of the circular hole I provide small superficial slots $a'$ for purposes as will be shown.

$b$ indicates the head of the bolt, and $b'$ the round portion within the hole of the parts $a$, and $b^2$ the threaded portion.

$c$ is a washer of suitable proportions, the hole of which corresponds with the circular hole of the parts $a$. It is provided with lugs or projections $c^3$, which are adapted to engage with the slots $a'$ upon the face of the parts $a$. The washer $c$ is provided, as a component part thereof, with one or more raised springs $c'$, adapted for the purpose, as will be shown, of engagement with teeth $d^3$ at the foot of an inner threaded nut, which is composed of a head or top $d$, a threaded neck $d^2$, and a shoulder $d^4$, all comprehending the thread $b^2$ of the bolt. An auxiliary inner threaded nut $d'$ comprehends the threaded neck $d^2$ for the purpose as will be shown. The washer $c$ is also provided with eyes $c^2$ for rivets or screws for the purpose as will be shown.

I do not limit myself to the use of the spring $c'$, as, if desired, more than one may be readily employed in connection with my device.

In using my invention the bolt is placed in position through the parts to be held together, and in case the parts $a$ are of metal the slots $a'$ are made with any suitable instrument. The washer $c$ is inserted over the bolt in such a manner that the lugs $c^3$ fit into the slots $a'$. The nut $d$ and its parts, carrying the auxiliary nut $d'$, are screwed upon the threaded portion $b^2$ of the bolt and screwed up until the shoulder $d^4$ impinges tightly upon the washer $c$ within a space not occupied by the spring $c'$, which spring engages at a proper point with one of the teeth $d^3$, holding the nut firmly, so that it will not become loosened by any jar if attached to heavy working machinery and the like, as the lugs $c^3$ of the washer are held securely in the slots $a'$ and the spring $c'$ securely holds the nut in position. To reverse the movement of the nut and to dissociate it from the bolt, the auxiliary nut $d'$ is screwed down by means of the thread $d^2$ and comes in contact with the spring $c'$, thus pressing it away from the teeth $d^3$. The nut $d$, &c., being then free from the spring may easily be backed off and removed from the bolt.

I have described the attachment of the washer $c$ to metal parts. If the parts be of wood, I then attach it to the part by means of rivets or screws through the eyes $c^2$, as well as by the lugs $c^3$. The spring $c'$ may be provided with a projection or finger-rest for greater facility in depressing it. The surface of the washer immediately in contact with the part held together may contain incisions made by a cold-chisel or other suitable method, thus creating a means of a firmer hold at its proper location.

It will be readily seen that among the many advantages which I claim for my nut-lock over the many styles in use is that the direct effect of the jar of heavy machinery when in operation which causes an ordinary nut to become loose in my invention produces the result that when the nut seeks to "climb" down the thread the pressure reacts upon the washer-spring, pressing against its companion tooth of the nut, causing the washer-lugs to adhere fixedly into position by pressure into the slots in the face of the parts being held together. A further advantage is found in the fact that my device may be applied to any ordinary bolt, thus rendering it cheap of construction and easy of adaption.

In positions where small bolts may be used and but little consequent strain a plain nut with teeth on its face may be employed in connection with the washer and its spring and the auxiliary nut dispensed with, as the spring $c'$ may be easily pressed away by the use of any ordinary measures from the teeth of the nut; but a certain superior degree of power is required in bolts of large dimensions and great holding powers.

Various other changes in the form and details of my invention may be resorted to at will without departing from the spirit and scope thereof. Therefore I consider myself entitled to all forms of the invention as apparently lie within the intent of my claims.

Having thus described my invention, I claim as new and desire to secure by Letters Patent—

1. A nut-lock comprising the combination of a bolt having the usual threaded portion outward thereof, the washer $c$ encircling the bolt and suitably attached to one of the parts to be held together, the spring $c'$ as a component part of such washer, the nut composed of the head $d$, threaded neck $d^2$ with teeth $d^3$ at its foot and shoulder $d^4$, adapted to impinge upon the washer $c$ independently of the spring $c'$ and the auxiliary nut $d'$ adapted to engage with the spring $c'$, said nut $d'$ screwing over the threaded portion $d^2$.

2. A nut-lock comprising the combination with the bolt of a washer attached to the parts to be held together, having a spring as a component part thereof, a nut screwing down upon the threaded part of the bolt, such nut composed of a head, a threaded neck having teeth at its foot and a shoulder, extending beyond the teeth such teeth adapted to engage with the spring of the washer, and an auxiliary nut screwing upon the threaded neck of the nut and adapted to move axially independent thereof and bearing against the entire washer.

3. A nut-lock comprising the combination with a bolt having a threaded portion extending outward therefrom, and a washer attached to one of the parts to be held together, provided with a spring thereon, a nut having teeth upon its face, said spring adapted to engage in the teeth of said nut, and a means movable on the nut for throwing said spring out of engagement with the teeth, substantially as described.

4. A nut-lock comprising the combination with a bolt having the usual threaded portion, and the parts adapted to be locked together, the nut having teeth upon its face, a means for engagement with said teeth and a means mounted on said nut and adapted to be moved inwardly to throw said first-named means out of engagement with the said teeth.

5. In combination with a bolt and the parts to be locked together, a nut-lock comprising a nut mounted on said bolt provided with teeth upon its face, a spring member carried by one of the parts to be locked, adapted to engage the teeth of said nut, and an auxiliary nut movable on the first-named nut adapted to throw said spring out of engagement with the teeth of the nut, substantially as described.

In testimony whereof I affix my signature in presence of two witnesses.

WILLIAM GHIGLIERI.

Witnesses:
 JOSHUA B. WEBSTER,
 PERCY S. WEBSTER.